(12) United States Patent
Mizunuma et al.

(10) Patent No.: US 10,836,081 B2
(45) Date of Patent: Nov. 17, 2020

(54) DEVICE FOR FORMING THIN FILM MEMBER AND METHOD OF FORMING THIN FILM MEMBER

(71) Applicant: TOSHIBA KIKAI KABUSHIKI KAISHA, Tokyo (JP)

(72) Inventors: Koji Mizunuma, Sunto-gun (JP); Tadamasa Furuya, Sunto-gun (JP); Tomonori Yamaguchi, Sunto-gun (JP)

(73) Assignee: TOSHIBA KIKAI KABUSHIKI KAISHA, Tokyo (JP)

( * ) Notice: Subject to any disclaimer, the term of this patent is extended or adjusted under 35 U.S.C. 154(b) by 247 days.

(21) Appl. No.: 15/994,424

(22) Filed: May 31, 2018

(65) Prior Publication Data

US 2018/0345543 A1  Dec. 6, 2018

(30) Foreign Application Priority Data

Jun. 2, 2017 (JP) ................... 2017-110214

(51) Int. Cl.
*B29C 43/46* (2006.01)
*B29C 43/24* (2006.01)
(Continued)

(52) U.S. Cl.
CPC .............. *B29C 43/46* (2013.01); *B29C 43/24* (2013.01); *B29C 43/58* (2013.01); *B29C 43/245* (2013.01);
(Continued)

(58) Field of Classification Search
CPC ....... B29C 43/24; B29C 43/245; B29C 43/44; B29C 43/46; B29C 43/58;
(Continued)

(56) References Cited

U.S. PATENT DOCUMENTS

| 4,810,179 A | 3/1989 | Cavanagh |
| 4,838,156 A | 6/1989 | Hafner et al. |
| 2006/0260484 A1* | 11/2006 | Mizunuma ............ B29C 43/245 |
| | | 101/216 |

FOREIGN PATENT DOCUMENTS

| CN | 2582770 | 10/2003 |
| CN | 2582770 Y * | 10/2003 |

(Continued)

OTHER PUBLICATIONS

CN 2582770Y, Xie, Oct. 29, 2003, machine translation to Eng. (Year: 2003).*

(Continued)

*Primary Examiner* — Joseph S Del Sole
*Assistant Examiner* — Lawrence D. Hohenbrink, Jr.
(74) *Attorney, Agent, or Firm* — DLA Piper LLP US

(57) ABSTRACT

A thin film member forming device includes a reference roll fixedly disposed while being rotatably supported by a first bearing member, a movable roll disposed movably with respect to the reference roll while being rotatably supported by a second bearing member, a roll gap adjusting mechanism which adjusts a gap between the reference roll and the movable roll and a roll opening mechanism which expands the gap. The roll gap adjusting mechanism adds a load in a direction to narrow the gap to the second bearing member, and the roll opening mechanism adds a load in a direction to expand the gap to the second bearing member.

15 Claims, 8 Drawing Sheets

(51) Int. Cl.
*B29C 43/58* (2006.01)
*B29L 7/00* (2006.01)
*B29C 43/44* (2006.01)

(52) U.S. Cl.
CPC ........ *B29C 43/44* (2013.01); *B29C 2043/467* (2013.01); *B29C 2043/5808* (2013.01); *B29C 2043/5825* (2013.01); *B29C 2043/5833* (2013.01); *B29C 2043/5841* (2013.01); *B29L 2007/008* (2013.01)

(58) Field of Classification Search
CPC .... B29C 2043/5808; B29C 2043/5825; B29C 2043/5833; B29C 2043/5841; B29C 2043/467
USPC .......................................................... 264/310
See application file for complete search history.

(56) References Cited

FOREIGN PATENT DOCUMENTS

| | | |
|---|---|---|
| CN | 1880039 | 12/2006 |
| CN | 1990235 | 7/2007 |
| CN | 203958727 | 11/2014 |
| EP | 1 009 606 | 1/2005 |
| JP | S47-3541 B | 1/1972 |
| JP | S50-2149 | 1/1975 |
| JP | H1-71509 A | 3/1989 |
| JP | H04-50393 | 2/1992 |
| JP | 2000-271950 | 10/2000 |
| JP | 2007-1280 | 1/2007 |
| JP | 2007-44913 | 2/2007 |
| JP | 2007-55036 | 3/2007 |
| TW | 200730328 | 8/2007 |
| WO | WO 2014/111527 | 7/2014 |

OTHER PUBLICATIONS

Taiwanese Office Action issued in TW Application No. 107117661 dated Feb. 14, 2019.
Japanese Office Action in JP 2017-110214, dated Nov. 26, 2019.
Chinese Office Action issued in CN 201810553216.9 dated Feb. 28, 2020.
Korean Office Action in KR 10-2018-0060968, dated Jan. 31, 2020.

* cited by examiner

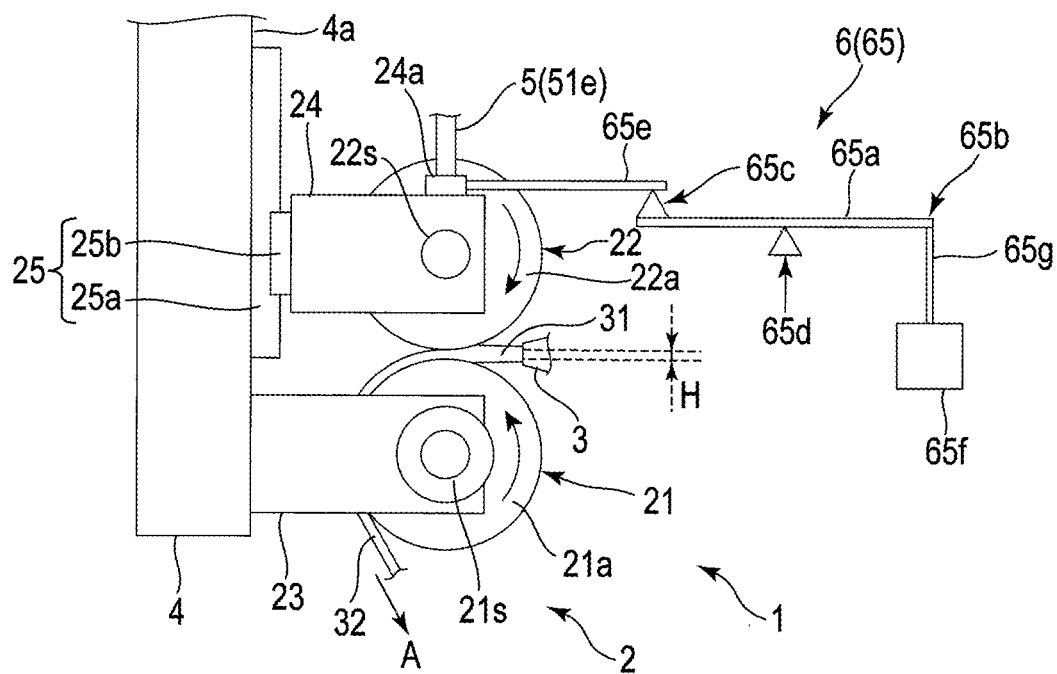
F I G. 7

DEVICE FOR FORMING THIN FILM MEMBER AND METHOD OF FORMING THIN FILM MEMBER

CROSS-REFERENCE TO RELATED APPLICATIONS

This application is based upon and claims the benefit of priority from prior Japanese Patent Application No. 2017-110214, filed Jun. 2, 2017, the entire contents of which are incorporated herein by reference.

BACKGROUND OF THE INVENTION

1. Field of the Invention

Embodiments described herein relate generally to a technique of forming a sheet or film (to be referred to as a thin film member) by passing molten resin between two rolls arranged parallel to each other with a predetermined gap therebetween.

2. Description of the Related Art

As a forming device for a thin film member based on an extrusion method, such a device is conventionally known that forms a thin film member by passing molten resin between two rolls arranged parallel to each other with a predetermined gap therebetween and sandwiching it by these rolls with pressure. When forming the thin film member, the gap between the two rolls (to be called roll gap) is appropriately adjusted. A forming device comprising such a mechanism (gap adjustment mechanism) for adjusting the roll gap has already been proposed.

For example, in the adjustment of the roll gap using a hydraulic servo actuator, when a molten resin is pressurized through the rolls by the hydraulic cylinder at a load of a certain degree, the adjustment can be stably controlled. On the other hand, when the pressing load applied to the rolls (molten resin) from the hydraulic cylinder is small, the adjustment of the roll gap cannot be stably controlled.

The hydraulic servo actuator can be divided mainly into a servo-pump type and a servo-valve type. In the servo-pump type hydraulic servo actuator, one servo pump is connected to one cylinder and the position of the piston of the cylinder is controlled by the servo pump. On the other hand, in the servo-valve type hydraulic servo actuator, a plurality of cylinders are actuated by one hydraulic pump, and the position of the piston is controlled by one servo valve provided in each cylinder. In the following descriptions, as long as it is not specifically pointed out, the hydraulic cylinder mechanism including both systems of the servo pump and the servo valve will be referred to as the hydraulic servo actuator.

For example, in the case of the servo-pump type, if the piston rod of the cylinder is pressurizing the rolls (more specifically, the bearings thereof) at a constant load, the servo pump rotates in one direction corresponding to the direction in which the piston rod is pushed, (which is an advancing direction). Thus, the roll gap is stably controlled. On the other hand, if the load applied to the rolls by the piston rod of the cylinder is not enough, the servo pump repeats normal and reverse rotations. Therefore, the roll gap cannot be stably controlled.

In the case of the servo-valve type, if the piston rod of the cylinder is pressurizing the rolls (molten resin) at a constant load, the servo valve operates only in a direction in which the piston rod pushes the rolls. Therefore, the roll gap can be stably controlled. On the other hand, if the load pressing the rolls by the piston rod is not enough, the valve operates to push/pull (move forward/backward) the piston rod. Therefore, the roll gap cannot be stably controlled. Further, when the piston rod of the cylinder switches from pushing to pulling or pulling to pushing, backlash may occur due to, for example, a possible gap in the junction between the piston rod and the bearing or inside the bearing. If a backlash occurs, the roll gap cannot be stably controlled. But, if the operating direction of the servo valve is only one way, which is the direction in which the piston rod pushes the roll, the effect by the backlash can be suppressed.

Incidentally, if two rolls are displaced from the horizontal direction to be placed, for example, up and down along the gravitational (vertical) direction (that is, a vertical arrangement), the hydraulic servo actuator adjusts the roll gap in the following manner. That is, the roll gap is adjusted based on the relationship between the two loads (the first load and second load). The first load is a total of loads applied by various members in a direction of narrowing the roll gap. The various members which can add load in this direction include the upper roll, a bearing which rotatably supports the upper roll, a shaft member of the upper roll, a cooling medium and the like. The second load is a load required to pressurize the molten resin to form into the thin film member. Note that even if the two rolls are arranged not in the vertical direction but along a direction inclined with respect to the horizontal direction, the roll gap can be adjusted based on the relationship between the first load and the second load.

When the second load is less than first load, the hydraulic servo actuator controls the piston rod of the cylinder in a direction of holding up the upper roll (expanding the roll gap). On the other hand, when the second load is greater than first load, the hydraulic servo actuator controls the piston rod of the cylinder in a direction of bringing the upper roll closer to a lower roll (narrowing the roll gap).

When the second load is close to the first load and the roll gap is controlled constantly, the load which brings the upper roll into contact with the lower roll is frequently varied due to the variation in thickness of the thin film member, and the like. For this reason, the holding up of the upper roll and the bringing the upper roll closer to the lower roll must be carried out alternately by the hydraulic servo actuator. Therefore, due to the influence of the mechanical backlash of the hydraulic servo actuator, the roll gap cannot be stably controlled.

In the case of the servo-pump type hydraulic servo actuator, if the servo pump is stopped by a power failure or the like during fabrication of a thin film member (in other words, while bringing the upper roll closer to the lower roll), it is difficult to open/close (move apart from or closer to each other) the two rolls. In this case, the servo pump serves as a resistance and therefore the hydraulic fluid in the cylinder is stopped to flow. Therefore, the piston and piston rod of the cylinder are locked at the position at the time of the power failure, and the position of the upper roll with respect to the lower roll is fixed. Here, in consideration of the total weight of the upper roll and the like (that is, the first load), it is substantially impossible to open the two rolls (move them apart from each other) by an external force.

Moreover, even after a power failure, molten resin is supplied to between two the rolls for a certain period of time. Therefore, if the two rolls are closed (very close to each other), molten resin accumulates between these rolls. If the resin accumulates excessively, for example, rubber rolls, low-rigid rolls or the like, which are easily elastically deformed, may be damaged.

Under these circumstances, there is a demand for stabilizing the adjustment of the roll gap with use of a hydraulic servo actuator. In particular, there is a great demand for maintaining the roll gap appropriately and stabilizing the second load even if the rolls are vertically arranged and the load (second load) required to form a thin film member is less than the load (first load) due to the self-weight of the upper roll (movable roll) and the like. Further, even in the case of power failure or the like, the rolls need to be open promptly to protect the rolls.

BRIEF SUMMARY OF THE INVENTION

In general, according to one embodiment, a thin film member forming device of forming a thin film member with two rolls, comprises a reference roll fixedly disposed while being rotatably supported by a first bearing, a movable roll disposed movably with respect to the reference roll while being rotatably supported by a second bearing, a roll gap adjusting mechanism which adjusts a gap between the reference roll and the movable roll and a roll opening mechanism which expands the gap, the reference roll and the movable roll being arranged in such a manner that rotation center axes thereof are parallel to each other and an angle θ made between a plane passing both the rotation center axes and a horizontal plane falls within a range of: 0°≤θ≤90°, the roll gap adjusting mechanism adding a load in a direction to narrow the gap to the second bearing, and the roll opening mechanism adding a load in a direction to expand the gap to the second bearing.

According to another embodiment, a thin film member forming method of forming a thin film member with two rolls, comprises fixedly arranging a reference roll while being rotatably supported by a first bearing, arranging a movable roll to be movable with respect to the reference roll while being rotatably supported by a second bearing, in such a manner that a rotation central axis of the movable roll is parallel to a rotation central axis of the reference roll, and an angle θ made between a plane passing both of the rotation center axes and a horizontal plane falls within a range of: 0°≤θ≤90°, and adding a load in a direction to narrow a gap between the reference roll and the movable roll while a load in a direction to expand the gap being added to the second bearing, according to a pressing force towards the reference roll produced by self weights of the movable roll and the second bearing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 is a schematic diagram showing a roll opening mechanism of the forming device for forming a thin film member according to the fifth modification.

DETAILED DESCRIPTION OF THE INVENTION

Hereafter, a device for forming a thin film member and a method of forming a thin film member, according to an embodiment of the present invention will be described with references to FIGS. 1 to 9. In this embodiment, the thin film member to be formed is a resin-made thin film member, which is, for example, a sheet or a film. The use of the thin film member is not particularly limited.

Figure 1:
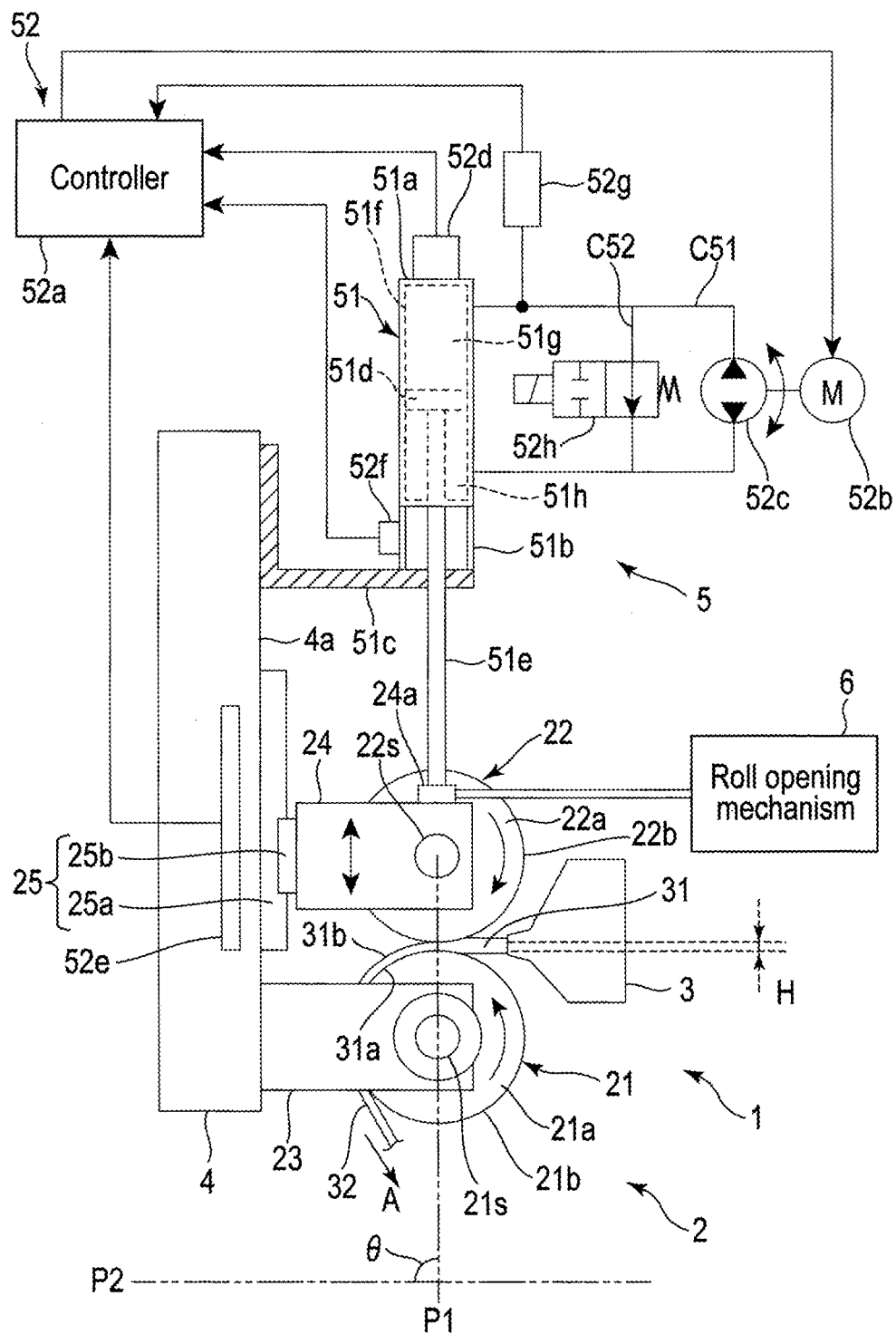
FIG. 1 is a schematic diagram showing a structure of a forming device for forming a thin film member according to the first embodiment.
Figure 2:
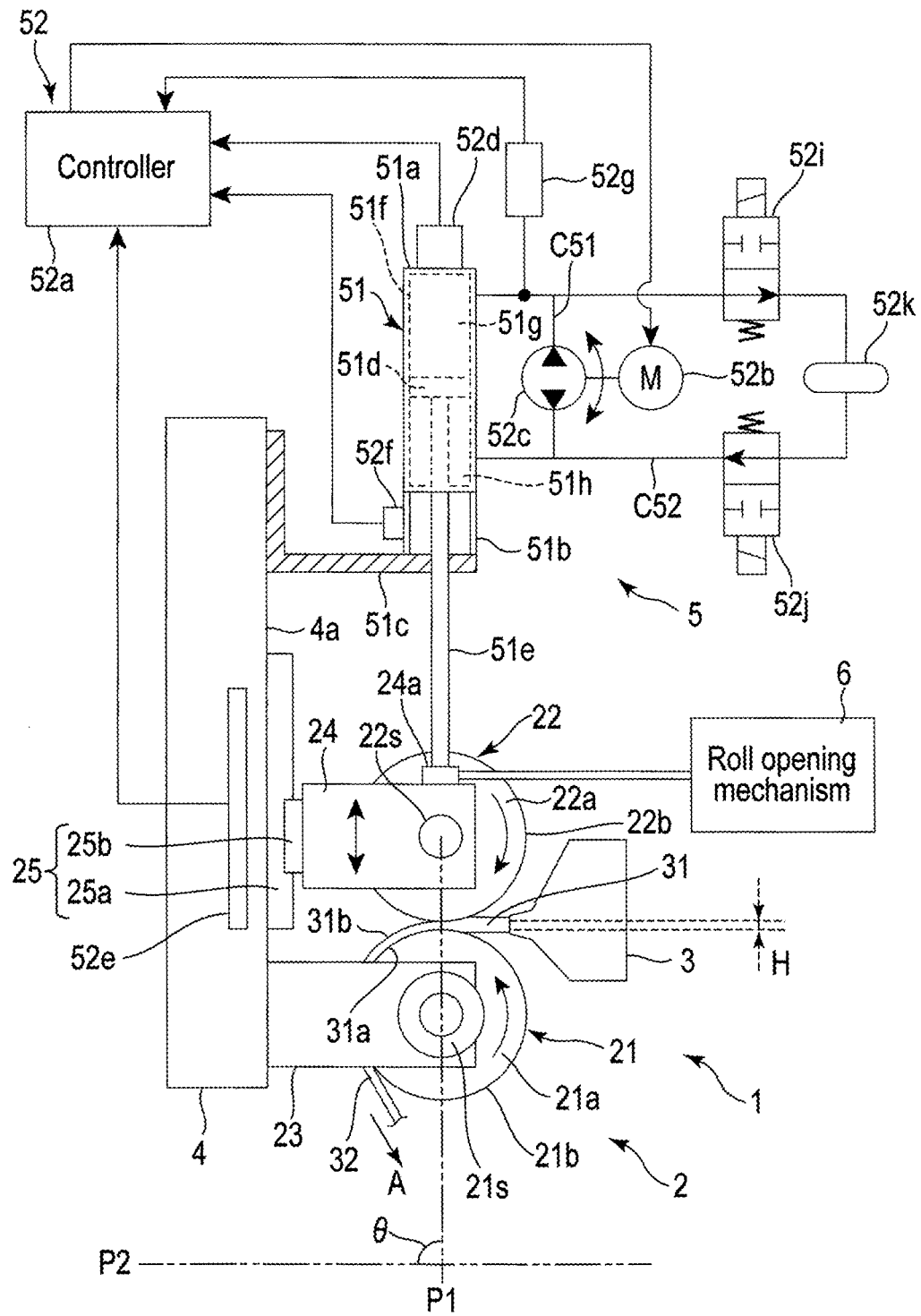
FIG. 2 is a schematic diagram showing a forming device for forming a thin film member according to the first modification (a diagram showing a flow channel of a roll gap adjusting mechanism).

FIG. 1 is a schematic diagram showing the structure of a thin film member forming device 1 according to the first embodiment. The thin film member forming device 1 comprises a forming roll unit 2 including a plurality of rolls. FIG. 1 shows, as an example, the forming roll unit 2 including two rolls to form a thin film member, but the number of rolls may be three or more.

The forming roll unit 2 is configured to include a reference roll 21 and a movable roll 22. The reference roll 21 and the movable roll 22 sandwiches the molten resin 31 between the rolls 21 and 22 to form a thin film member 32 while cooling it, and conveys the formed thin film member 32 along a conveying direction A. Between the reference roll 21 and the movable roll 22, the molten resin 31 is expanded into a thin film from a T die 3, to be fed out (supplied).

The reference roll 21 and the movable roll 22 are disposed in the same base stage 4 each rotatably around an axial core (rotation central axis) of each of shaft members 21s and 22s. The shaft members 21s and 22s of the rolls 21 and 22 are coupled with a motor (not shown) by their proximal end side to rotate by a driving force of the motor. The shaft members 21s and 22s are rotatably supported by the bearing members 23 and 24 in a pair, respectively, by both ends of the reference roll 21 and the movable roll 22 along the width direction. FIG. 1 shows only the distal end side of the bearing members 23 and 24 (an opposite side to the coupling side between the shaft members 21s and 22s and the motor), but the proximal end side (the coupling between the bearing members 21s and 22s and the motor) is configured to be similar. The reference roll 21 rotates in a predetermined direction (for example, counter-clockwise rotation), whereas the movable roll 22 rotates in a reverse direction to that of the reference roll 21 (for example, clockwise rotation). The bearing members 23 and 24 are arranged to be coaxial with the axial cores of the shaft members 21s and 22s, respectively.

The reference roll 21 and the movable roll 22 are each configured as a temperature-adjustable roll, and are maintained at a preset desired temperature. The set temperature is a temperature with which the molten resin 31 fed out from the T die 3 is not fused but its pliability is maintained while being cooled. For example, the reference roll 21 and the movable roll 22 are formed to have a double cylindrical structure in which outer cylinders 21a and 22a and inner cylinders (not shown) are coaxially displaced. The outer cylinders 21a and 22a and the inner cylinders are all circular cylinders whose cross sections are normal to the axial cores of the shaft members 21s and 22s, and are arranged such that circumferential surfaces 21b and 22b face each other. The circumferential surface 21b of the reference roll 21 and the circumferential surface 22b of the movable roll 22 face each other with a desired interval (gap) H therebetween.

Between each of the outer cylinders 21a and 22a and each respective one of the inner cylinders, a cooling medium is filled to circulate. With this structure, the temperatures of the reference roll 21 and the movable roll 22 (more specifically, the outer cylinders 21a and 22a thereof) are adjusted to cool the molten resin 31. As the cooling medium, water, oil or the like is used, for example, according to the kind and properties of the molten resin.

The circumferential surface 21b of the outer cylinder 21a of the reference roll 21 serves as a transfer surface (to be referred to as a transfer surface 21b) as opposed to one forming surface 31a of the molten resin 31. The transfer surface 21b is configured to be able to convey the thin-film molten resin 31 fed out from the T die 3 along the conveying direction A. The transfer surface 21b can be formed into, for example, a mirror surface or a shaping surface subjected to a pattern, emboss processing or the like according to the usage of the thin film member 32 to be formed, as in the case of the transfer surface 21b of the reference roll 21.

The circumferential surface 22b of the outer cylinder 22a of the movable roll 22 serves as a transfer surface (to be referred to as a transfer surface 22b hereinafter) as opposed to the other forming surface 31b of the molten resin 31. The outer cylinder 22a of the movable roll 22 presses the transfer surface 22b against the forming surface 31b of the molten resin 31, and presses the forming surface 31a of the molten resin 31 against the transfer surface 21b of the reference roll 21 with the transfer surface 22b pressed against the forming surface 31b. The transfer surface 22b of the movable roll 22 may be formed into, for example, a mirror surface or a shaping surface subjected to a pattern, emboss processing or the like according to the usage of the thin film member 32 to be formed, as in the case of the transfer surface 21 of the reference roll 21.

The reference roll 21 and the movable roll 22 are arranged such that the axial cores of the shaft members 21s and 22s are parallel to each other. Further, if the angle made by a plane P1 passing the axial cores (rotation central axes) of both the shaft members 21s and 22s and a horizontal plane P2 is defined as e, the reference roll 21 and the movable roll 22 are arranged so that the angle θ falls within a range of 0°≤θ≤90°. Note that the horizontal plane P2 is a plane crossing the plane along the gravitational (vertical) direction (normal to the plane).

As an example of this embodiment, the forming roll unit 2 is configured so that the movable roll 22 is vertically arranged with respect to the reference roll 21 thereabove, along the vertical direction (see FIG. 1). In such vertical arrangement, the angle θ is 90°. If the angle θ is 0°, the reference roll 21 and the movable roll 22 are arranged parallel to each other along the horizontal plane P2 (horizontal arrangement). If the angle θ falls within a range of 0°<θ<90°, the reference roll 21 and the movable roll 22 are arranged in an oblique direction in which the plane P1 is inclined to the horizontal plane P2 by the angle θ (oblique arrangement).

The first bearing member 23 is fixed to the base 4. Thus, the reference roll 21 is fixedly arranged on the base 4 through the first bearing member 23 while the shaft member 21s is rotatably supported by the first bearing member 23. On the other hand, the movable roll 22 is arranged on the base 4 so as to be movable (approaching and separating) with respect to the reference roll 21 while the shaft member 22s is rotatably supported by the second bearing member 24.

In order to move the movable roll 22 with respect to the reference roll 21, the thin film member forming device 1 comprises a roll gap adjusting mechanism 5 and a roll opening mechanism 6. The roll gap adjusting mechanism 5 is a mechanism for adjusting the gap H between the reference roll 21 and the movable roll 22. More specifically, the roll gap adjusting mechanism 5 moves the second bearing member 24 closer to the reference roll 21 fixed to the base 4 by moving the movable roll 22 towards (closer to) the base 4. The roll opening mechanism 6 is a mechanism for expanding the gap H between the reference roll 21 and the movable roll 22. More specifically, the roll opening mechanism 6 moves the movable roll 22 apart from the reference roll 21 fixed to the base 4 by moving the second bearing member 24 away with respect to the base 4.

In the base 4, guide members 25 are provided to move the movable roll 22 (plainly, the second bearing member 24). The guide members 25 in pair are arranged respectively both ends of the movable roll 22 along the width direction.

FIG. 1 shows the structures of the distal end side of the roll gap adjusting mechanism 5 (on an opposite side to the coupling side between the shaft member 22s and the motor), the roll opening mechanism 6 and the guide member 25, but a similar structure is provided on the proximal end side as well. Therefore, in the following description provided below, only the structures of the distal end side of the roll gap adjusting mechanism 5, the roll opening mechanism 6 and the guide member 25 will be explained.

In this embodiment, a linear guide common to the roll gap adjusting mechanism 5 and the roll opening mechanism 6 is provided as the guide member 25 (to be referred to as the linear guide 25 hereinafter). The linear guide 25 comprises a guide rail 25a linearly extending and a block 25b which moves back and forth along the guide rail 25a. The guide rail 25a is provided on an installation surface 4a of the base 4 so as to cross normal to the extending direction of the axial core of the shaft member 22s of the movable roll 22. A block 25b is built onto the second bearing member 24 and integrated with the second bearing member 24. Thus, the movable roll 22 is movable back and forth through the second bearing member 24 and the block 25b along the guide rail 25a. That is, the movable roll 22 can move close to and away from the reference roll 21 by moving the second bearing member 24 back and forth along the guide rail 25a.

The roll gap adjusting mechanism 5 adds the load of a desired direction to the second bearing member 24 to adjust the gap H between the rolls 21 and 22 while sandwiching the molten resin 31 between the reference roll 21 and the movable roll 22. For example, the roll gap adjusting mechanism 5 adds to the second bearing member 24 the load in the direction which narrows the gap H between the rolls 21 and 22. Thus, the roll gap adjusting mechanism 5 makes the movable roll 22 closer to the reference roll 21 to narrow the gap H. In this embodiment, the downward load along the gravitational (vertical) direction is added to the second bearing member 24 by, the roll gap adjusting mechanism 5.

The roll opening mechanism 6 adds to the second bearing member 24 the load in the direction which expands the gap H. This load has a heavy load since there is also a partial load of the actuator. Such a load may not necessarily be equal between both ends (right and left) of the movable roll 22 along the width direction, or different therebetween. Thus, the roll opening mechanism 6 moves the movable roll 22 away from the reference roll 21 to expand the gap H between the rolls 21 and 22. The roll opening mechanism 6 adds the load in the direction to extend the gap H (to be referred to as the second load hereinafter) according to a pressing force towards the reference roll 21 produced by the self weight of the movable roll 22 and the second bearing member 24 (to be referred to as the first load hereinafter). The self weights of the movable roll 22 and the second bearing member 24 include the loads of the parts of the shaft member 22s attached to these members and a temperature control medium such as the cooling liquid in the movable roll 22. Hereafter, the self weight of the movable roll 22, the second bearing member 24, etc., will be referred to as a roll self weight.

The second load is greater than or equal to the first load. Thus, even if the angle θ is arbitrarily adjustable within a range of 0°≤θ≤90° or a fixed value within the range, it is possible to make the load in the direction to narrow the gap H (to be referred to as the third load hereinafter) regardless of the fixed value at all times, as a positive value in the thin film member forming device 1. That is, in the thin film member forming device 1, the third load, which is the load in the direction to narrow the gap H, is added by the roll gap adjusting mechanism 5 while adding the second load by the roll opening mechanism 6.

For example, when the angle θ is 90° (the reference roll 21 and the movable roll 22 are vertically arranged) as in this embodiment, the entire roll self weight become the first load and serves as the pressing force with respect to the reference roll 21. In this case, the second load should just be greater than or equal to the roll self weight. On the other hand, when the angle θ is in a range of 0°<θ<90° (the reference roll 21 and the movable roll 22 are obliquely arranged), the component in the oblique direction of the roll self weight (when W represents the roll self weight, W sinθ) becomes the first load and becomes the pressing force towards the reference roll 21. In this case, the second load should just be greater than or equal to the pressing force towards the reference roll 21 produced by the roll self weight, that is, the component in the oblique direction of the roll self weight (W sinθ). In this case as well, it is possible to make the third load a positive value at all times. Viewing from another way, the component in the oblique direction of the roll self weight (W sinθ) is equivalent to the partial force along the plane P1 of the roll self weight.

When the angle θ is arbitrarily adjustable within a range of 0°≤θ≤90°, the load in the direction to narrow the gap H (the third load) and the load in the direction to extend the gap H (the second load) are applied relatively from a certain direction to the point of action (a load action portion 24a as an example) of the second bearing member 24. That is, it suffices if the roll gap adjusting mechanism 5 and the roll opening mechanism 6 are rotated according to the angle θ.

The pressing force actually acting towards the reference roll 21 (to be referred to as the fourth load hereinafter) (F4) is a total of the first load (F1) and the third load (F3) (F4=F1+F3). For example, if the fourth load (F4) is equal to a load (F5) required to press the molten resin 31 when forming the thin film member 32 (F4=F5), the roll opening mechanism 6 does not need to add the second load (F2) (F2=0). Moreover, when a total of the first load (F1) and the third load (F3) is greater than the load (F5) required to press the molten resin 31 when forming the thin film member 32 (F1+F3>F5), a load equivalent to the difference (F1+F3−F5) should just be added as the second load (F2). For example, the roll opening mechanism 6 should just add the load (dF1) equivalent to an excessive portion of the first load (F1) as the second load (F2) (F2=dF1). Thus, the movable roll 22 is pressed towards the reference roll 21 by the load (F5), which is obtained by subtracting the second load (F2) from the total load of the first load (F1) and the third load (F3), thereby forming the thin film member 32. In this case, the roll opening mechanism 6 does not need to add, as the second load (F2), the load greater than or equal to the roll self weight (W) or the component of the roll self weight along the oblique direction (W sinθ).

In this embodiment, since the angle θ is 90°, a upward predetermined load in the gravitational (vertical) direction is added to the second bearing member 24 by the roll opening mechanism 6. The predetermined load (the second load) is greater than or equal to the roll self weight. That is, the second load is greater than or equal to the pressing force (the first load) added in the direction to narrow the gap H by the roll self weight.

Therefore, when the reference roll 21 and the movable roll 22 are vertically arranged, the roll self weight (the first load) can be canceled by the roll opening mechanism 6. After the second load is cancelled, the load (F5) required to press the molten resin 31 when forming the thin film member 32 can be added to the movable roll 22 from the roll gap adjusting mechanism 5. Therefore, the molten resin 31 can be continuously pressed with the necessary load F5 through the movable roll 22.

Here, the structures of the roll gap adjusting mechanism 5 and the roll opening mechanism 6 will be described in detail. First, the structure of the roll gap adjusting mechanism 5 will be described.

The roll gap adjusting mechanism 5 comprises a hydraulic servo actuator 51 and a control device 52. The hydraulic servo actuator 51 is configured to be able to apply the load in the desired direction, more specifically, the force in the direction to narrow the gap H (the third load, for example, the pressing force) onto the second bearing member 24. In this embodiment, the pressing force should just as well to act on the second bearing member 24, but the hydraulic servo actuator 51 may be configured to be able to apply the pressing force and a force in its opposite direction (a traction force as an example) in addition thereto. The control device 52 is configured to be able to control the hydraulic servo actuator 51.

As shown in FIG. 1, the hydraulic servo actuator 51 comprises a cylinder body 51a, a connection cylinder 51b, a support frame 51c, a piston 51d and a piston rod 51e. The cylinder body 51a includes a cylinder 51f inside. To the cylinder body 51a, the connection cylinder 51b is connected.

The connection cylinder 51*b* is supported by the support frame 51*c*. That is, the cylinder body 51*a* is supported by the base 4 through the support frame 51*c*.

The piston 51*d* is accommodated in the cylinder 51*f* of the cylinder body 51*a*. The piston 51*d* is configured to be reciprocative along the cylinder 51*f*. The cylinder 51*f* is of a multi-acting type and includes an advancing chamber 51*g* on one side and a retreating chamber 51*h* on the other side while interposing the piston 51*d* therebetween. The advancing chamber 51*g* and the retreating chamber 51*h* are separated by the piston 51*d*.

The piston rod 51*e* is configured to be put through from the retreating chamber 51*h* to the cylinder body 51*a* and the connection cylinder 51*b*. A proximal end of the piston rod 51*e* is connected to the piston 51*d* and a distal end of the piston rod 51*e* is connected to the load action portion 24*a* of the second bearing member 24. The load action portion 24*a* is a part of the second bearing member 24, on which the pressing force (or the traction) acts from the piston rod 51*e* (simply, the roll gap adjusting mechanism 5). For example, it is provided at the part which normally crosses with the axial core (rotation central axis) of the shaft member 22 of the movable roll 22 and straightly faces the guide rail 25*a* of the linear guide 25 along the horizontal direction.

In order to adjust the gap H between the reference roll 21 and the movable roll 22, the control device 52 carries out the following control. For example, the control device 52 pressurizes the advancing chamber 51*g* and decompresses the retreating chamber 51*h*. As a result, the piston 51*d* moves forward to apply the pressing force on the load action portion 24*a* of the second bearing member 24 from the distal end of the piston rod 51*e*. Thus, the second bearing member 24 is pressed to move forward (descend) along the guide rail 25*a*. That is, the movable roll 22 is moved close to the reference roll 21 to narrow the gap H.

On the other hand, the control device 52 can decompresses the advancing chamber 51*g* and pressurize the retreating chamber 51*h*. As a result, the piston 51*d* is retreated to apply the traction force onto the load action portion 24*a* of the second bearing member 24 from the distal end of the piston rod 51*e*. Thus, the second bearing member 24 is pulled to move backwards (ascend) along the guide rail 25*a*. That is, the movable roll 22 is separated from the reference roll 21 to be able to expand the gap H.

The control device 52 comprises a controller 52*a*, a servo motor 52*b*, a servo pump 52*c*, a first measuring instrument 52*d*, a second measuring instrument 52*e*, a load cell 52*f* and a pressure sensor 52*g*.

The controller 52*a* is configured to control the servo motor 52*b* based on the output signal (a result of the measurement) described later. The servo motor 52*b* is configured to drive the servo pump 52*c* to be able to selectively control the pressure applied on the advancing chamber 51*g* and the retreating chamber 51*h*. The servo pump 52*c* is configured as a bi-directional pump which can supply/exhaust a hydraulic fluid to/from the hydraulic servo actuator 51 (specifically, the cylinder 51*f*).

In the hydraulic servo actuator 51, to pressurize the advancing chamber 51*g*, the hydraulic fluid is supplied to the advancing chamber 51*g* from the servo pump 52*c* to increase the hydraulic pressure in the advancing chamber 51*g*. In this case, the hydraulic fluid is discharged from the retreating chamber 51*h* by the servo pump 52*c*, and the hydraulic pressure in the retreating chamber 51*h* is decreased. Thus, the pressing force can be applied onto the second bearing member 24 as described above.

On the other hand, in order to pressurize the retreating chamber 51*h*, the hydraulic fluid is supplied to the retreating chamber 51*h* from the servo pump 52*c* to increase the hydraulic pressure in the retreating chamber 51*h*. In this case, the hydraulic fluid is discharged from the advancing chamber 51*g* by the servo pump 52*c* to decrease the hydraulic pressure in the advancing chamber 51*g*. Thus, the traction force can be applied onto the second bearing member 24 as described above.

The first measuring instrument 52*d*, the second measuring instrument 52*e*, the load cell 52*f* and the pressure sensor 52*g* each carry out a respective predetermined measurement and output signals of the measurement results to the controller 52*a*. In order to apply the pressing force (or the traction force) onto the second bearing member 24, the controller 52*a* controls the servo motor 52*b* based on these output signals (the measurement results) to drive the servo pump 52*c*. For example, the timing and amount of feeding the hydraulic fluid to the advancing chamber 51*g* or the retreating chamber 51*h*, and the increment/decrement of the hydraulic pressure and the like are controlled.

The first measuring instrument 52*d* is configured to measure a position of the piston 51*d* in the cylinder body 51*a* (the cylinder 51*f*) so as to be able to output the measurement results thereof. The second measuring instrument 52*e* is configured to measure a position of the second bearing member 24 so as to be able to output the measurement results thereof. The load cell 52*f* is configured to measure the load added to the connection cylinder 51*b* so as to be able to output the measurement results thereof. The pressure sensor 52*g* is configured measures the hydraulic pressure in each of the advancing chamber 51*g* and the retreating chamber 51*h* so as to be able to output the measurement results thereof.

Thus, the pressing force (or the traction force) can be applied accurately to the second bearing member 24. As a result, the gap H between the reference roll 21 and the movable roll 22 can be adjusted with high precision. Therefore, for example, the pressing state (press load or the like) of the movable roll 22 onto the molten resin 31 can be varied accurately.

Here, in the roll gap adjusting mechanism 5, the hydraulic fluid of the hydraulic servo actuator 51 can flow one of two channels, a first channel C51 and a second channel C52. The first channel C51 is provided to supply/exhaust (flow) the hydraulic fluid between the cylinder 51*f* and the servo pump 52*c* at usual time, that is, during the operation of the servo pump 52*c*. That is, the first channel C51 connects the advancing chamber 51*g* and the retreating chamber 51*h* of the cylinder 51*f* via the servo pump 52*c*.

On the other hand, the second channel C52 is a bypass channel which bypasses the first channel C51 to allow the hydraulic fluid to flow without passing through the servo pump 52*c* in a power failure or a failure of the servo pump 52*c* (to be referred to as power failure or the like), that is, when the servo pump 52*c* stops. Thus, the second channel C52 connects the advancing chamber 51*g* and the retreating chamber 51*h* of the cylinder 51*f* directly to each other without passing through the servo pump 52*c*. The second channel C52 may be formed around on an inner or outer side of the first channel C51.

The second channel C52 is provided with an open/close valve 52*h*. The open/close valve 52*h* is close when operating the servo pump 52*c* to block the second channel C52. On the other hand, the open/close valve 52*h* is open when the servo pump 52*c* is stopped, to open the second channel C52. Here, the blockage is in the state where the hydraulic fluid of the hydraulic servo actuator 51 does not flow in the second channel C52 and the opening is the state where the hydraulic fluid flows in the second channel C52.

The open/close valve 52h is a two-port electromagnetic valve comprising a solenoid (coil), a plunger (movable block), a spring and an internal flow channel. The internal flow channel is configured to be communicatable with the second channel C52. FIG. 1 shows the state where the servo pump 52c is stopped when a power failure, and the second channel C52 is open (the hydraulic fluid of the hydraulic servo actuator 51 being flowable).

For example, at the normal operation of driving the servo pump 52c, the coil of the open/close valve 52h is in an electrically conducting state. When the coil is conducting electricity, the movable block moves to block the internal flow channel and shuts this. Thus, the open/close valve 52h blocks the second channel C52. On the other hand, at the time of power failure, in which the servo pump 52c is stopped, the coil of the open/close valve 52h is in a non-conducting state. When the coil is not conducting electricity, the movable block is pushed by a spring to open the internal flow channel, and stops still in this state. Thus, the open/close valve 52h opens the second channel C52. But, the specification of the open/close valve 52h is not limited to that described above.

Thus, the open/close valve 52h is provided in the second channel C52 so as to allow the hydraulic fluid of the hydraulic servo actuator 51 not to flow to the second channel C52 but flow only to the first channel C51 at the usual time. In this case, the pressing force (or traction force) can be applied onto the second bearing member 24 as described above. At the time of power failure or the like, the hydraulic fluid of the hydraulic servo actuator 51 can be bypassed to flow from the first channel C51 to the second channel C52. Therefore, even if the servo pump 52c is stopped at the time of power failure or the like, the hydraulic fluid can be supplied to the retreating chamber 51h while bypassing the servo pump 52c and also the hydraulic fluid is discharged from the advancing chamber 51g. That is, the hydraulic fluid can be allowed to flow through the second channel C52 without having the servo pump 52c to serve as a resistance. Therefore, it is possible to prevent the piston 51d from being locked in the cylinder 51f at the position at the time of power failure or the like. As a result, the movable roll 22 can be separated away from the reference roll 21 with an external force to easily expand the gap H between the rolls 21 and 22.

Note that the structure of the bypassing channel to bypass the first channel C51 is not limited to that of the second channel C52 as shown in FIG. 1. For example, as in the first modification of the thin film member forming device 1 shown in FIG. 2, two open/close valves 52i and 52j may be provided in the second channel C52 and a reservoir portion 52k which reserves the hydraulic fluid may be interposed between the open/close valves. The two open/close valves 52i and 52j are closed at the usual time, (in which the coil is conducting electricity), to block the second channel C52, and shut the inflow and outflow of the hydraulic fluid with respect to a tank. On the other hand, the two open/close valves 52i and 52j are opened at the time of power failure or the like, (which the coil is not conducting electricity), to open the second channel C52, thereby enabling inflow or outflow of the hydraulic fluid to a tank. As the reservoir portion 52k, for example, a tank to which temporarily reserves the hydraulic fluid or an accumulator which varies its internal volume changes with pressure is applicable.

With the two open/close valves 52i and 52j and the reservoir portion 52k provided, the hydraulic fluid can be allowed to flow more smoothly when the second channel C52 is open.

Figure 3:
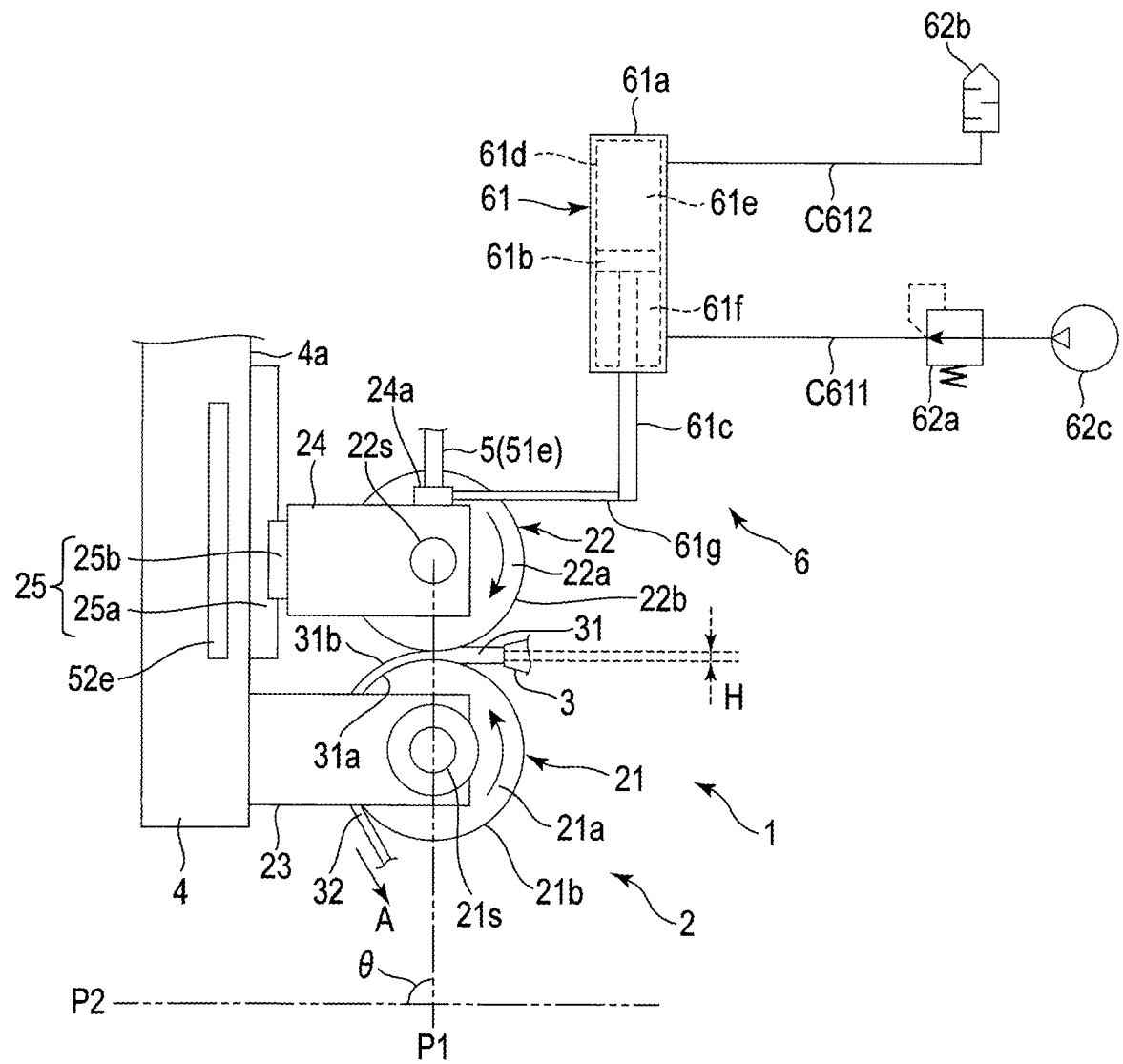
FIG. 3 is a diagram showing a flow channel of a roll opening mechanism of the forming device for forming the thin film member according to the first embodiment.

Next, the structure of the roll opening mechanism 6 will be described. FIG. 3 is a diagram showing the channel of the roll opening mechanism 6. As shown in FIG. 3, the roll opening mechanism 6 comprises a cylinder device (to be referred to as air cylinder) 61, a first pressure reducing valve 62a and an exhaust portion 62b. The air cylinder 61 is configured to be able to apply the load in the predetermined direction, specifically the force in the direction to expand the gap H (the traction force as an example) onto the second bearing member 24 of the movable roll 22.

The air cylinder 61 comprises a cylinder body 61a, a piston 61b and a piston rod 61c. The cylinder body 61a is supported by the base 4 and the cylinder 61d is formed inside of the cylinder body 61a. The cylinder body 61a may just be supported by the base 4, but may be supported by a support stand separately provided.

The piston 61b is accommodated in the cylinder 61d of the cylinder body 61a. The piston 61b is configured to be reciprocative along the cylinder 61d. The cylinder 61d is of a multi-acting type and includes an advancing chamber 61e on one side and a retreating chamber 61f on the other side while interposing the piston 61b therebetween. The advancing chamber 61e and the retreating chamber 61f are separated by the piston 61b.

The piston rod 61c is configured to be put from the retreating chamber 61f through the cylinder body 61a. The proximal end of the piston rod 61c is connected to the piston 61b, and the distal end of the piston rod 61c is connected to the load action portion 24a of the second bearing member 24. Note that the distal end of the piston rod 61c should just be connected with one part of the second bearings member 24, and a destination of the connection is not limited to the load action portion 24a. Moreover, the piston rod 61c (the distal end thereof as an example) and the second bearing member 24 (the load action portion 24a as an example) may not necessarily be connected directly to each other. In this embodiment, a coupling member 61g is interposed between the piston rod 61c and the load action portion 24a. The piston rod 61c and the load action portion 24a are connected to each other through the coupling member 61g. The coupling member 61g should just be an arm-shaped member without a support shaft. In place of the coupling member 61g, for example, a crank mechanism with a support shaft may be used to connect the piston rod 61c and the second bearing member 24 to each other.

The retreating chamber 61f is pressurized at all times by the compressor 62c through the first pressure reducing valve 62a. The first pressure reducing valve 62a adjusts the supply pressure of air (exhaust air) from the compressor 62c to an air channel C611. When opening the reference roll 21 and the movable roll 22 from each other (expanding the gap H between the rolls 21 and 22), the advancing chamber 61e is released to the atmosphere through the exhaust portion 62b of the air channel C612. As a result, the piston 61b moves forward and the traction force acts on the load action portion 24a of the second bearing member 24 from the distal end of the piston rod 61c. Thus, the second bearing member 24 can be pulled to move back (ascend) along the guide rail 25a. That is, the movable roll 22 is separated away from the reference roll 21 to expand the gap H. Note that the cylinder device of the roll opening mechanism 6 may be not the air cylinder 61, but a hydraulic cylinder which uses a hydraulic fluid as a pressure medium. In this case, to open the reference roll 21 and the movable roll 22 from each other (expand the gap H), the hydraulic fluid should just be returned to the fluid reservoir in place of releasing to the atmosphere.

As described above, the second load is greater than the first load. Therefore, even if the reference roll 21 and the movable roll 22 are vertically arranged, the first load can be reliably canceled by the roll opening mechanism 6.

As a result, even at the time of power failure or the like, it is possible to separate the movable roll 22 from the reference roll 21 by the roll opening mechanism 6 and easily expand the gap H between the rolls 21 and 22.

In the roll opening mechanism 6 describe above, the air channel in which the air of the air cylinder 61 flows is not limited to the channel structure (the air channels C611 and C612) shown in FIG. 3. For example, such a channel structure may be adopted that the air pressure to cancel the first load and form the thin film member 32 and the air pressure to open the reference roll 21 and the movable roll 22 from each other may be differentiated from each other.

Figure 4:
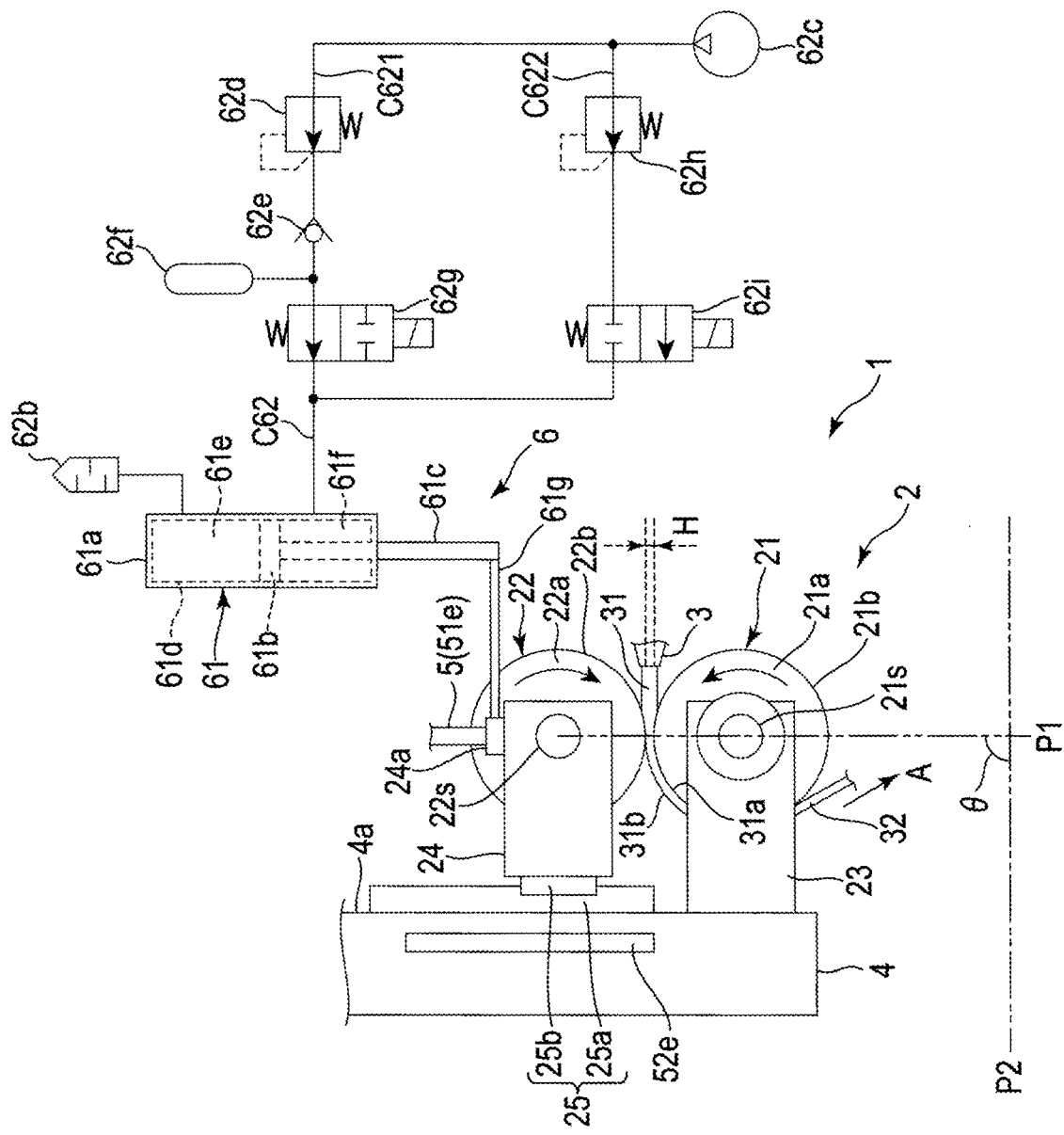
FIG. 4 is a diagram showing a flow channel of a roll opening mechanism of the forming device for forming a thin film member according to the second modification.

FIG. 4 shows a modification of the roll opening mechanism 6 comprising an air channel C62 which can change the air pressure. FIG. 4 is a diagram showing a channel of the roll opening mechanism 6 of the thin film member forming device 1 according to the second modification. The air channel C62 is connected to the retreating chamber 61f of the cylinder 61d. The advancing chamber 61e of the cylinder 61d is connected to the exhaust portion 62b. To the air channel C62, the air is supplied by the compressor 62c. In the air channel C62, an inflow channel of the air from the compressor 62c to the retreating chamber 61f is branched into two. To one of which (a first branch channel C621), a second pressure reducing valve 62d (one of the pressure reducing valves), a check valve 62e, a reservoir portion 62f and a first open/close valve 62g are provided in order between the compressor 62c and the retreating chamber 61f. To the other (to be referred to as a second branch channel C622), a third pressure reducing valve 62h (the other pressure reducing valve) and a second open/close valve 62i are provided between the compressor 62c and the retreating chamber 61f. The second pressure reducing valve 62d adjusts the pressure of the air supplied from the compressor 62c to a pressure higher than that of the third pressure reducing valve 62h.

The check valve 62e is configured to be able to allow the air to flow only towards the reservoir portion 62f from the compressor 62c. The reservoir portion 62f reserves the air supplied to the retreating chamber 61f when opening the reference roll 21 and the movable roll 22. As the reservoir portion 62f, for example, an accumulator can be applied. The first open/close valve 62g and the second open/close valve 62i each are a two-port electromagnetic valve comprising a solenoid (coil), a plunger (movable block), a spring and an internal flow channel. The internal flow channel of each first and second open/close valves are configured to be communicatable with the respective branch channel.

For example, when forming the thin film member 32, the two open/close valves are both set in the state where the coil is conducting electricity. When the coil is conducting electricity, the internal flow channel is closed by the movable block in the first open/close valve 62g to shut the first branch channel C621. On the other hand, the movable block is pushed by a spring and the second open/close valve 62i opens the internal flow channel to connect the second branch channel C622 to the compressor 62c. Thus, the air is supplied to the retreating chamber 61f through the second branch channel C622 from the compressor 62c. In this case, the supply pressure of air to the retreating chamber 61f is adjusted by the third pressure reducing valve 62h. Moreover, even if the first branch channel C621 is shut down, the air is supplied through the check valve 62e from the compressor 62c and reserved in the reservoir portion 62f.

On the other hand, when opening the reference roll 21 and the movable roll 22 from each other at the time of power failure or the like, the coil is not conducting electricity in each of the two open/close valves. When the coil is not conducting electricity, the movable block is pushed by a spring and the first open/close valve 62g opens the internal flow channel to connect the first branch channel C621 to the reservoir portion 62f. On the other hand, the internal flow channel is closed by the movable block and the second open/close valve 62i shuts the second branch channel C622. Thus, the air is supplied to the retreating chamber 61f through the first branch channel C621. In that case, the air is directly supplied to the retreating chamber 61f from the reservoir portion 62f through the first open/close valve 62g. Therefore, the pressure of the air supplied to the retreating chamber 61f is made higher than that of the usual time when the air is supplied from the second branch channel C622.

Note also when opening the reference roll 21 and the movable roll 22 from each other at the time other than the power failure or the like, the pressure of the air supplied to the retreating chamber 61f is made higher than that of the usual time when the air is supplied from the second branch channel C622. In this case, the coils of the two open/close valves 62g and 62i are not in the conducting state and the first branch channel C621 is connected to the compressor 62c by the first open/close valve 62g, whereas the second branch channel C622 is shut by the second open/close valve 62i. Thus, the air is supplied to the retreating chamber 61f through the second pressure reducing valve 62d from the compressor 62c.

With the air channel C62 which can vary the air pressure, the traction force acting on the second bearing member 24 from the roll opening mechanism 6 can be reduced at the usual time. That is, the traction force at the time of forming the thin film member 32 can be set to the minimum required to cancel the first load needed and stabilize the control. On the other hand, at the time of power failure or the like, the pressure of the air supplied to the retreating chamber 61f can be made higher than that of the usual time. That is, the traction force which acts on the second bearing member 24 from the roll opening mechanism 6 can be increased at the time of power failure or the like. Therefore, the two rolls 21 and 22 can be opened from each other more promptly.

Figure 5:
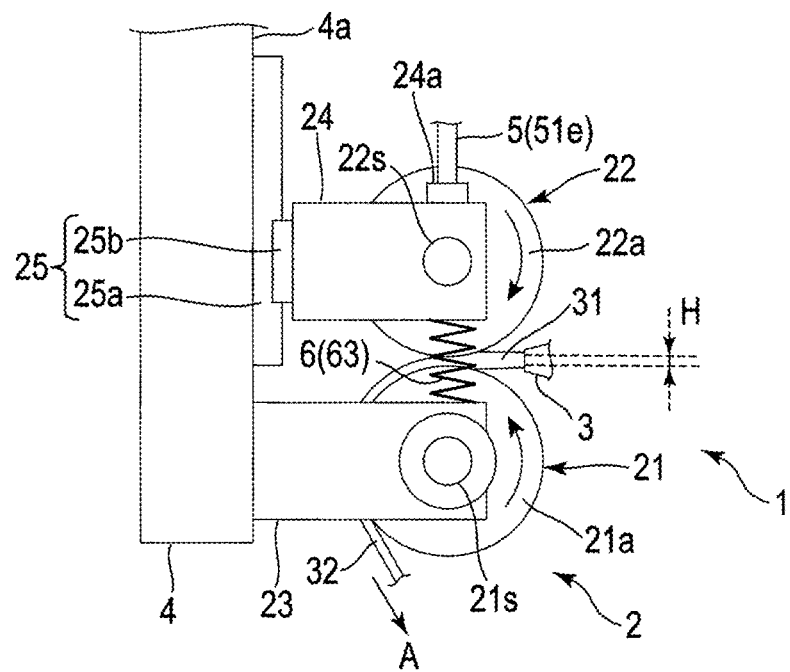
FIG. 5 is a schematic diagram showing a roll opening mechanism of the forming device for forming a thin film member according to the third modification.
Figure 6:
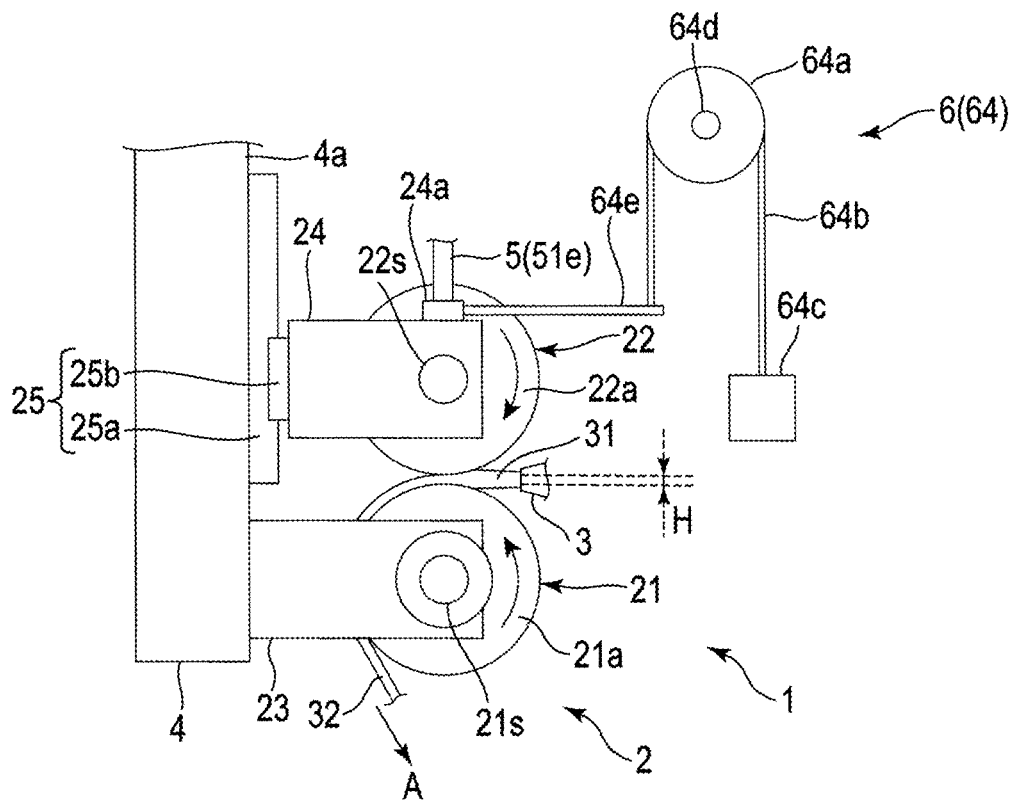
FIG. 6 is a schematic diagram showing a roll opening mechanism of the forming device for forming a thin film member according to the fourth modification.

The structure of the roll opening mechanism 6 is not limited to the mechanism comprising the air cylinder 61 described above. Not such an electrically controlled mechanism, but, for example, a simpler mechanism which does not require the electrical control can be adopted. FIGS. 5 to 7 show modifications of a simple roll opening mechanism 6. Each of these modifications has a basic structure similar to that of the first embodiment (including the first and second modifications) except that the roll opening mechanism 6 has a simple structure. This basic structure is omitted from the drawings.

FIG. 5 is a schematic diagram showing a roll opening mechanism 6 of the thin film member forming device 1 according to the third modification. As shown in FIG. 5, the roll opening mechanism 6 comprises a spring 63. The spring 63 is configured to be able to apply the traction force (the force in the direction to extend the gap H) onto the second bearing member 24 of the movable roll 22. Therefore, the spring 63 is interposed between the first bearing member 23 of the reference roll 21 and the second bearing member 24 of the movable roll 22. But, if a predetermined traction force is applied onto the second bearing member 24, the arrangement of the spring 63 is not limited to this.

The spring 63 is configured to be able to add the load (the second load) greater than or equal to the first load to the second bearing member 24 by the urging force at the time of contraction (the expanding force). Therefore, even if the reference roll 21 and the movable roll 22 are vertically arranged, the first load can be cancelled reliably by the spring 63. In this case, at the usual time when the servo pump 52c of the roll gap adjusting mechanism 5 is driven, the first load is canceled by the spring 63.

Similarly, even at the time of power failure or the like, when the servo pump 52c is stopped, the spring 63 cancels the first load. Here, the third load is not added from the roll gap adjusting mechanism 5, the spring 63 cancels the first load and also is still expandable. As described above, at the time of power failure or the like, the movable roll 22 can be separated away from the reference roll 21 by external force. Moreover, the force of the spring 63 to expand acts to push up the second bearing member 24 of the movable roll 22, (which is a traction force if put in another way). Therefore, the urging force (expanding force) of the spring 63 can expand the gap H between the reference roll 21 and the movable roll 22.

FIG. 6 is a schematic diagram showing a roll opening mechanism 6 of the thin film member forming device 1 according to the fourth modification. As shown in FIG. 6, the roll opening mechanism 6 comprises a pulley structure 64. The pulley structure 64 is configured to be able to apply the traction force (force in the direction to expand the gap H) onto the second bearing member 24 of the movable roll 22.

The pulley structure 64 comprises a fixed pulley 64a, a rope 64b looped over the fixed pulley 64a and a weight 64c attached to one end of the rope 64b. The fixed pulley 64a has a shaft 64d which should just be supported by the base 4, but may be supported by a separate fix stand. An end (other end) of the rope 64b on an opposite to the end where the weight 64c is attached is connected to the load action portion 24a of the second bearing member 24. The other end of the rope 64b should just be connected to one part of the second bearings member 24, but a destination of the connection is not limited to the load action portion 24a. Moreover, the rope 64b (the other end as an example) and the second bearing member 24 (the load action portion 24a as an example) may not necessarily be connected to each other directly. In this modification, the coupling member 64e is interposed between the rope 64b and the load action portion 24a. The rope 64b and the load action portion 24a are connected to each other through a coupling member 64e. The coupling member 64e should just be an arm-shaped member without a support shaft. But, the second bearing member 24 and the rope 64b may be connected through, for example, a crank mechanism with a support shaft in place of the coupling member 64e.

The weight 64c has a weight (equivalent to the second load) which can pull up the other end of the rope 64b by the force greater than or equal to the first load (a load greater than the first load as an example), i.e., which can tract (ascend) the second bearing member 24. The weight of the weight 64c may be different between both ends (right and left) of the movable roll 22 along the width direction. The shaft 64d can be formed from right and left portions coupled to each other.

Therefore, even if the reference roll 21 and the movable roll 22 are vertically arranged, the first load can be reliably cancelled by the weight 64c. In this case, at the usual time when the servo pump 52c of the roll gap adjusting mechanism 5 is being driven, the first load is canceled by the weight 64c.

Similarly, even at the time of power failure or the like, when the servo pump 52c is stopped, the weight 64c tracts (ascend) the load action portion 24a to cancel the first load. Here, the second load is not added from the roll gap adjusting mechanism 5, the weight 64c cancels the first load and further tract the load action portion 24a. Therefore, with the weight of the weight 64c, the gap H between the reference roll 21 and the movable roll 22 can be expanded.

FIG. 7 is a schematic diagram showing a roll opening mechanism 6 of the thin film member forming device 1 according to the fifth modification. As shown in FIG. 7, the roll opening mechanism 6 comprises a lever structure 65. The lever structure 65 is configured so as to be able to apply the traction force (force in the direction to expand the gap H) onto the second bearing member 24 of the movable roll 22.

The lever structure 65 is configured such that one end of a pole member 65a of a predetermined length is a point 65b where the force is applied, the other end is a point 65c of application and a middle point (for example, center) between the point 65b and the point 65c is a fulcrum 65d. The fulcrum 65d should just be supported by the base 4, but may be supported by a separate fix stand. The point 65c is connected to the load action portion 24a of the second bearing member 24. The point 65c should just be connected with one part of the second bearing member 24, but the destination of the connection is not limited to the load action portion 24a. Moreover, the point 65c and the second bearing member 24 (the load action portion 24a as an example) may not necessarily be connected to each other directly. In this modification, the first coupling member 65e is interposed between the point 65c and the load action portion 24a. The point 65c and the load action portion 24a are connected to each other through the first coupling member 65e. The first coupling member 65e should just be an arm-shaped member without a support shaft. But the point 65c and the second bearing member 24 may be connected to each other through, for example, a crank mechanism with a support shaft in place of the first coupling member 65e.

The weight 65f is attached to the point 65b. The weight 65f has a weight to apply a force greater than or equal to the first load (a load greater than the first load as an example) to the point 65c, which is a load (equivalent to the second load) which can tract (ascend) the second bearing member 24. But the force (weight of the weight 65f) acting on the point 65b may just be less than the force acting on the point 65c. Therefore, the weight of the weight 65f may be less than the first load.

The point 65b and the weight 65f may not necessarily be attached directly to each other. In this modification, the second coupling member 65g is interposed between the point 65b and the weight 65f. The point 65b and the weight 65f are connected to each other through a second coupling member 65g. The second coupling member 65g should just be a rope, a chain, a bar or the like, whose weight is negligible as compared to the weight 65f. When the weight is not negligible as compared to the weight 65f, the weight of the weight 65f is set to be able to tract (ascend) the second bearing member 24 in consideration of the weight of the second coupling member 65g.

Therefore, even if the reference roll 21 and the movable roll 22 are vertically arranged, the first load can be reliably cancelled by the weight 65f. In this case, at the usual time when the servo pump 52c of the roll gap adjusting mechanism 5 is being driven, the first load is canceled by the weight 65f.

Similarly, even at the time of power failure or the like, when the servo pump 52c is stopped, the weight 65f pulls (ascend) the load action portion 24a to cancel the first load. Here, no load is added from the roll gap adjusting mechanism 5, the weight 65f cancels the first load and further tracts the load action portion 24a. Thus, with the weight of the weight 65f, the gap H between the reference roll 21 and the movable roll 22 can be expanded.

The third to fifth modifications described above can be each applied solely as a single body, but they may be applied in any combination. For example, the spring 63 and the pulley structure 64 or the spring 63 and the lever structure 65 can be applied in combination. In this case, the spring 63 is used to cancel the first load at the usual time, whereas the pulley structure 64 and the lever structure 65 are used to open the reference roll 21 and the movable roll 22 from each other at the time of power failure or the like.

Moreover, these modifications are applicable in combination with the air cylinder 61. For example, the air cylinder 61, the lever structure 65 and the like are applicable in combination. In this case, the air cylinder 61 is used to cancel the first load at the usual time, whereas the lever structure 65 and the like can be used to open the rolls 21 and 22 from each other at the time of power failure or the like.

In the embodiment and the first to fifth modifications described above, the traction force applied onto the second bearing member 24 from the roll opening mechanism 6 is always used to cancel the first load. But, when the reference roll 21 and the movable roll 22 are arranged parallel to each other along the horizontal plane P2 (the angle θ is 0 degree), it is not necessary to cancel the first load by the roll opening mechanism 6.

That is, in this case, the load (F5) required to pressurize the molten resin 31 to form the thin film member 32 can be accurately added to the movable roll 22 by the roll gap adjusting mechanism 5 without cancelling the first load by the roll opening mechanism 6.

As described above, the embodiment may be configured to open the reference roll 21 and the movable roll 22 from each other (expand the gap H between the rolls 21 and 22) by applying such a traction force only at the time of power failure or the like without applying the traction onto the second bearing member 24 at the usual time. A thin film member forming device comprising such a roll opening mechanism will be described below as the second embodiment. In the second embodiment, only the structure unique to the thin film member forming device of this embodiment will be explained. Therefore, identical or similar structural members to those of the thin film member forming device 1 of the first embodiment described above, will be omitted from the illustration or designated by the same reference numbers in the drawings, and explanations therefor will be omitted.

Figure 8:
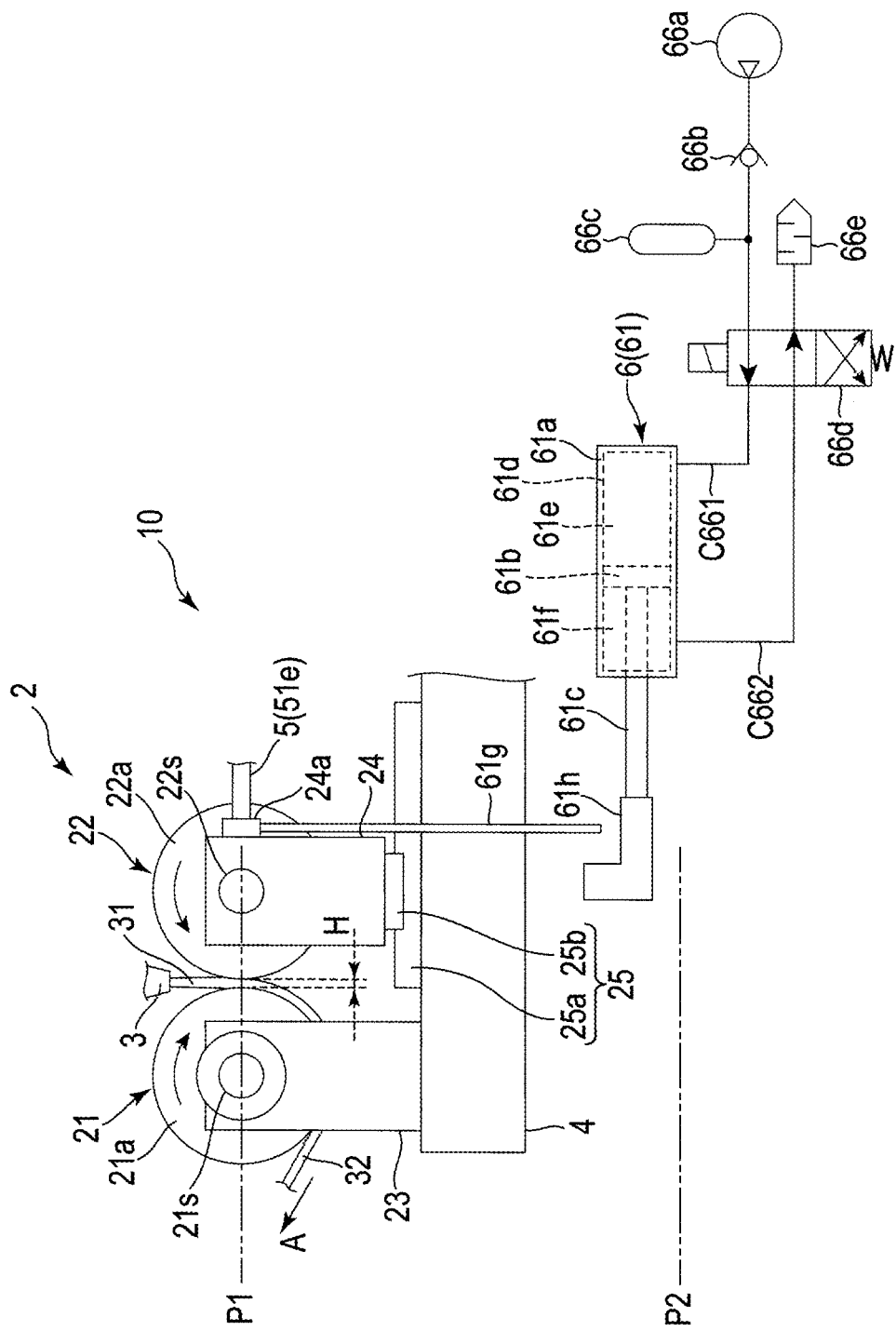
FIG. 8 is a schematic diagram showing a usual state of a forming device according to the second embodiment, such as forming a thin film member.
Figure 9:
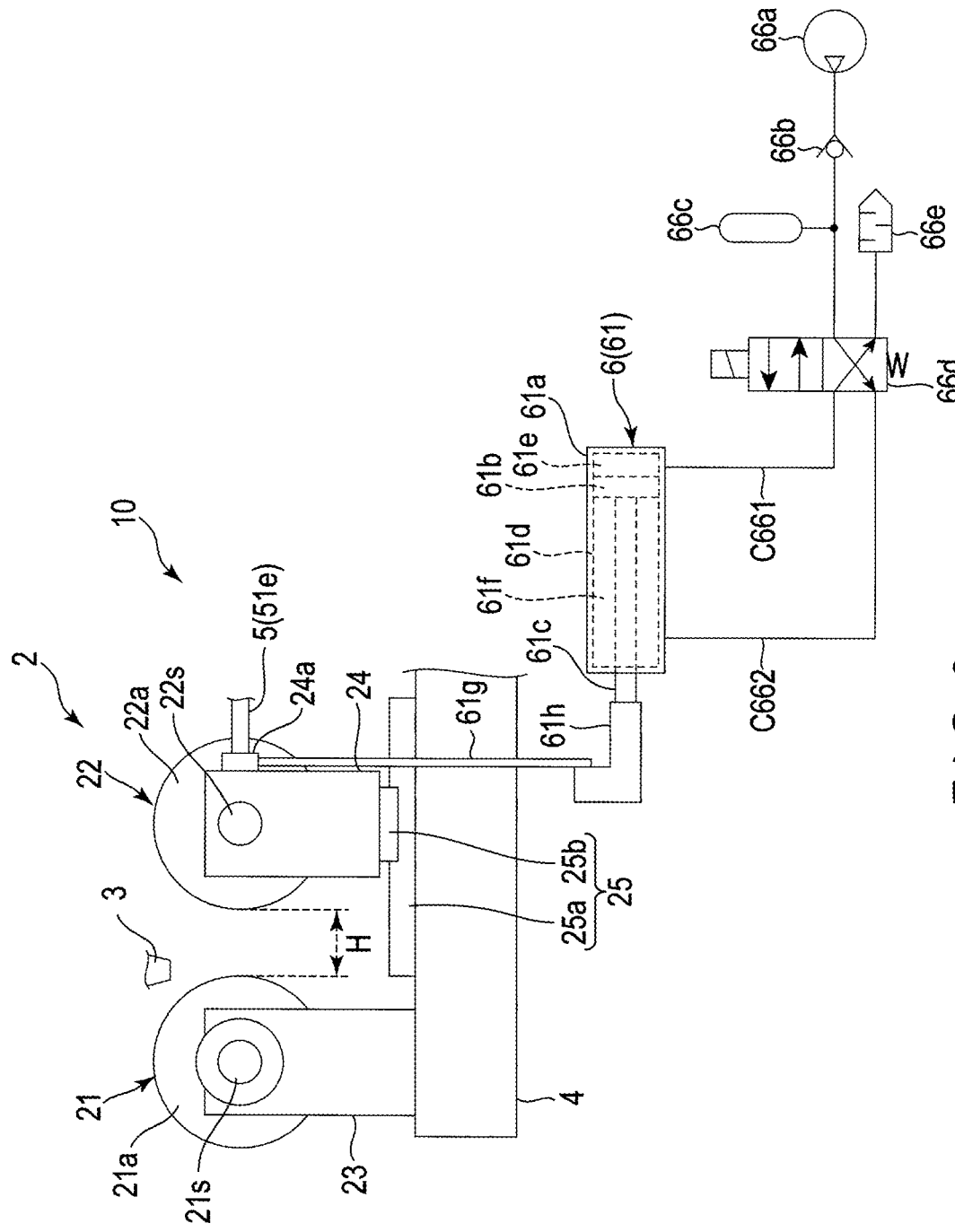
FIG. 9 is a schematic diagram showing a certain state of the forming device according to the second embodiment, such as forming the thin film member.

FIGS. 8 and 9 each are a schematic diagram showing the structure of a thin film member forming device 10 of the second embodiment. In this embodiment, a reference roll 21 and a movable roll 22 of a forming roll unit 2 are arranged parallel to each other along a horizontal plane P2 (the angle θ is 0 degree).

A piston rod 61c of an air cylinder 61 is connected by a distal end thereof to a load action portion 24a of a second bearing member 24. But, the distal end of the piston rod 61c should just be connected to one part of the second bearing member 24, and a destination of the connection is not limited to the load action portion 24a. Moreover, the piston rod 61c (the distal end thereof as an example) and the second bearing member 24 (the load action portion 24a as an example) may not necessarily be connected to each other directly. In this embodiment, two coupling members (to be referred to as a first coupling member 61g and a second coupling member 61h hereinafter) are interposed between the piston rod 61c and the load action portion 24a. The piston rod 61c and the load action portion 24a are connected to each other through the first coupling member 61g and the second coupling member 61h. The first coupling member 61g is connected to the load action portion 24a, and the second coupling member 61h is connected to the piston rod 61c.

As shown in FIGS. 8 and 9, the second coupling member 61h is configured to be not connected to the first coupling member 61g at the usual time, which is the forming of the thin film member 32 (at the time of operating the servo pump 62c), and to be connectable to the first coupling member 61g only when desired such as the time of power failure or the like. That is, as shown in FIG. 8, the piston rod 61c is not connected to the second bearing member 24 at the usual time. Therefore, at the usual time, the traction force is not applied from the piston rod 61c onto the second bearing member 24 (inhibiting the addition of the load to the direction to extend the gap H between the rolls 21 and 22). In this case, the advancing chamber 61e of the cylinder 61d is connected to the air channel C661 so as to be pressurized by the compressor 66a. Between the compressor 66a and the advancing chamber 61e, the check valve 66b, the reservoir portion (the accumulator as an example) 66c and the third open/close valve 66d are provided in order. The third open/close valve 66d opens the air channel C661 to enable the supply of air from the compressor 66a to the advancing chamber 61e. In that case, the air is supplied through the check valve 66b from the compressor 66a to the reservoir portion 66c so as to be reserved therein. The retreating chamber 61f is connected to the air channel C662 so as to be communicated to the exhaust portion 66e.

On the other hand, when opening the reference roll 21 and the movable roll 22 from each other (expanding the gap H between the rolls 21 and 22), the piston rod 61c is connected to the second bearing member 24 as shown in FIG. 9. Thus, the traction force is applied from the piston rod 61c to the second bearing member 24 to expand the gap H between the rolls 21 and 22. For example, the second coupling member 61h can be formed into substantially an L shape, a hook type or the like, to be engaged with the first coupling member 61g. Alternatively, the second coupling member 61h may be configured to comprise a through-hole in which the first coupling member 61g can be put through, so as to hook the first coupling member by a peripheral edge portion of the through-hole for traction.

In this case, air is supplied to the retreating chamber 61f through the air channel C662, so as to be pressurized. At that time, a third electromagnetic valve 66d opens the air channel C662 to enable the supply of air to the retreating chamber 61f. For example, at the time of power failure or the like, air is supplied to the retreating chamber 61f from the reservoir portion 66c, whereas at the time of other than power failure or time, air is supplied to the retreating chamber 61f from the compressor 66a. The advancing chamber 61e is released to the atmosphere through the exhaust portion 66e. As a result, the piston 61b moves forward and the piston rod 61c is connected to the second bearing member 24.

As described above, according to the first embodiment and its first to fifth modifications and the second embodiment of the present invention, the gap H between the reference roll 21 and the movable roll 22 can be stably adjusted by the roll gap adjusting mechanism 5 comprising the hydraulic servo actuator 51. That is, the gap H can be appropriately maintained and thus the pressing force of the movable roll 22, required to form the thin film member 32 can be stabilized. Moreover, even at the time of power failure or the like, the reference roll 21 and the movable roll 22 can be opened from each other promptly, and thus the rolls 21 and 22 can be protected from resin accumulation.

While certain embodiments (including modifications) have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the first embodiment and its first to fifth modifications and the second embodiment, described above, are directed to the adjustment of the gap H between the reference roll 21 and the movable roll 22. But, the object of the adjustment is not limited to the gap H between the reference roll 21 (first roll) and the movable roll 22 (second roll). For example, the roll gap adjusting mechanism 5 and the roll opening mechanism 6 may be applied to adjust the gap between the movable roll 22 and the third roll placed in a downstream of the movable roll 22 in the conveying direction A of the thin film member 32. Or the roll gap adjusting mechanism 5 and the roll opening mechanism 6 are also applicable to the adjustment of the gap between rolls placed in a further downstream in the conveying direction A.

What is claimed is:

1. A thin film member forming device for forming a thin film member by sandwiching a molten resin supplied from a T die between two rolls, the device comprising:
   a base;
   a first bearing member fixed to the base;
   a reference roll fixedly disposed while being rotatably supported by the first bearing member;
   a guide member provided in the base;
   a second bearing member guided by the guide member;
   a movable roll disposed movably with respect to the reference roll while being rotatably supported by the second bearing member;
   a roll gap adjusting mechanism which is supported by the base, is connected to the second bearing member, adds a load to the second bearing member, and adjusts a gap between the reference roll and the movable roll;
   a roll opening mechanism which is supported by the base, is connected to the second bearing member, adds a load to the second bearing member, and expands the gap,
   the reference roll and the movable roll being arranged in such a manner that rotation center axes thereof are parallel to each other and an angle θ made between a plane passing both the rotation center axes and a horizontal plane falls within a range of: 0°≤θ≤90°, and
   the roll gap adjusting mechanism pressing the molten resin via the movable roll by adding a load to the second bearing member in a direction to narrow the gap while the roll opening mechanism adds a load to the second bearing member in a direction to expand the gap.

2. The device of claim 1, wherein
the roll gap adjusting mechanism adds the load in the direction to narrow the gap while the load in the direction to expand the gap is added by the roll opening mechanism, according to a pressing force towards the reference roll produced by self weights of the movable roll and the second bearing member.

3. The device of claim 1, wherein
the roll gap adjusting mechanism comprises a hydraulic cylinder, a servo pump which supplies/discharges a hydraulic fluid to the hydraulic cylinder, a first channel which allows the hydraulic fluid to flow between the hydraulic cylinder and the servo pump, a second channel which bypasses the first channel without passing via the servo pump and an open/close valve which opens/closes the second channel, and
the open/close valve closes the second channel when the servo pump is driven and opens the second channel when the servo pump is stopped.

4. The device of claim 3, wherein
the roll opening mechanism comprises at least one of a cylinder device, a spring, a pulley structure and a lever structure, and adds a load to the second bearing member when the servo pump is stopped that is greater than that when the servo pump is driven.

5. The device of claim 4, wherein
the roll opening mechanism comprises the cylinder device, a compressor which supplies air, a pressure reducing valve which adjusts a pressure of the air supplied from the compressor, a reservoir portion which stores the air supplied from the compressor, an exhaust portion which opens the cylinder device to atmosphere and a check valve which regulates a direction of air flow,
the pressure reducing valve comprises two pressure reducing valves, one of which adjusts a pressure of the air supplied from the compressor higher than that of the other valve.

6. The device of claim 3, wherein
the reference roll and the movable roll are arranged so as to set the angle θ to approximately 0°, and
the roll opening mechanism inhibits the addition of the load in a direction to expand the gap to the second bearing member when the servo pump is driven.

7. A thin film member forming method of forming a thin film member by sandwiching a molten resin supplied from a T die between two rolls, the method comprising:
   fixedly arranging a reference roll while being rotatably supported by a first bearing member fixed to a base;
   arranging a movable roll to be movable with respect to the reference roll while being rotatably supported by a second bearing member guided by a guide member provided in the base, in such a manner that a rotation central axis of the movable roll is parallel to a rotation central axis of the reference roll, and an angle θ made between a plane passing both of the rotation center axes and a horizontal plane falls within a range of: 0°≤θ≤90°; and
   adding a load in a direction to narrow a gap between the reference roll and the movable roll to the second bearing member by a roll gap adjusting mechanism supported by the base and connected to the second bearing member while a load in a direction to expand the gap is added to the second bearing member by a roll opening mechanism supported by the base and connected to the second bearing member, according to a pressing force towards the reference roll produced by self weights of the movable roll and the second bearing member.

8. The method of claim 7, wherein the load in the direction to expand the gap is greater than or equal to a total of the self weights of the movable roll and the second bearing member.

9. The method of claim 7, wherein the load in the direction to expand the gap is greater than or equal to the pressing force towards the reference roll produced by the self weights of the movable roll and the second bearing member.

10. The method of claim 7, wherein the load in the direction to expand the gap is greater than or equal to a component of force of the self weights of the movable roll and the second bearing member along a plane passing the rotation central axes of the reference roll and the movable roll.

11. The method of claim 7, wherein the thin film member is formed by pressing the movable roll towards the reference roll with a load obtained by subtracting the load in the direction to expand the gap from a total of the pressing force towards the reference roll produced by the self weights of the movable roll and the second bearing member and the load in the direction to narrow the gap.

12. The method of claim 7, comprising:
blocking a second channel and driving a servo pump to supply/discharge a hydraulic fluid to a hydraulic cylinder through a first channel when forming the thin film member, and
opening the second channel and bypassing the servo pump to allow the hydraulic fluid from the first channel to the second channel when the servo pump is stopped.

13. The method of claim 12, comprising:
adding a load to the second bearing member when the servo pump is stopped that is greater than that when the servo pump is driven.

14. The method of claim 13, comprising:
storing air in a reservoir portion;
supplying the air stored in the reservoir portion to an air cylinder by a compressor in order to narrow the gap; and
regulating a direction of air flow from the compressor to the reservoir portion therebetween.

15. The method of claim 12, comprising:
arranging the reference roll and the movable roll so that the angle θ is approximately 0°; and
inhibiting addition of the load in the direction to expand the gap onto the second bearing member when the servo pump is driven.

* * * * *